United States Patent

[11] 3,591,271

[72] Inventor Frank B. Shropshire
 1623 Josselyn Canyon Road, Monterey, Calif. 93940
[21] Appl. No. 722,443
[22] Filed Apr. 18, 1968
[45] Patented July 6, 1971

[54] FILM CARTRIDGE
 3 Claims, 15 Drawing Figs.
[52] U.S. Cl. ................................................ 352/78, 352/128
[51] Int. Cl. .................................................. G03b 23/02
[50] Field of Search .................................... 352/72, 78, 73, 126, 128; 242/55.21, 199, 200

[56] References Cited
 UNITED STATES PATENTS

| | | | |
|---|---|---|---|
| 2,362,019 | 11/1944 | Moore | 242/200 |
| 2,380,088 | 7/1945 | Tickell | 352/126 (UX) |
| 3,025,750 | 3/1962 | Polan | 352/72 X |
| 3,244,471 | 4/1966 | Mead | 352/72 X |
| 3,446,551 | 5/1969 | Platt | 352/72 X |

Primary Examiner—Samuel S. Matthews
Assistant Examiner—Monroe H. Hayes
Attorney—Henry Grifford Hardy ABSTRACT: A film cartridge having a continuous spirally wound loose loop of exposed and printed film ready for projection, enclosed in a case having one flat side at right angles to the plane of projection which will guide and fit into a projector with precision and with no other adjustment. The cartridge is so structured that when placed within the projector the claw mechanism of the projector will engage the conventional perforations of the film to advance the same one frame at a time, either at motion picture speed or at a controlled single frame advancement. Each cartridge has a part of the projecting system, i.e., a self-contained mirror integral with and movable with the film platen, by which the projection light is gathered and directed through the film and into the optical system. The operation includes the unwinding of the film loop from the outside of the spiral loop for projection and simultaneously rewinding the film on the inside of the loop without any pull or drag on the film.

PATENTED JUL 6 1971

3,591,271

INVENTOR.
FRANK B. SHROPSHIRE
BY
Henry Gifford Hardy
Attorney

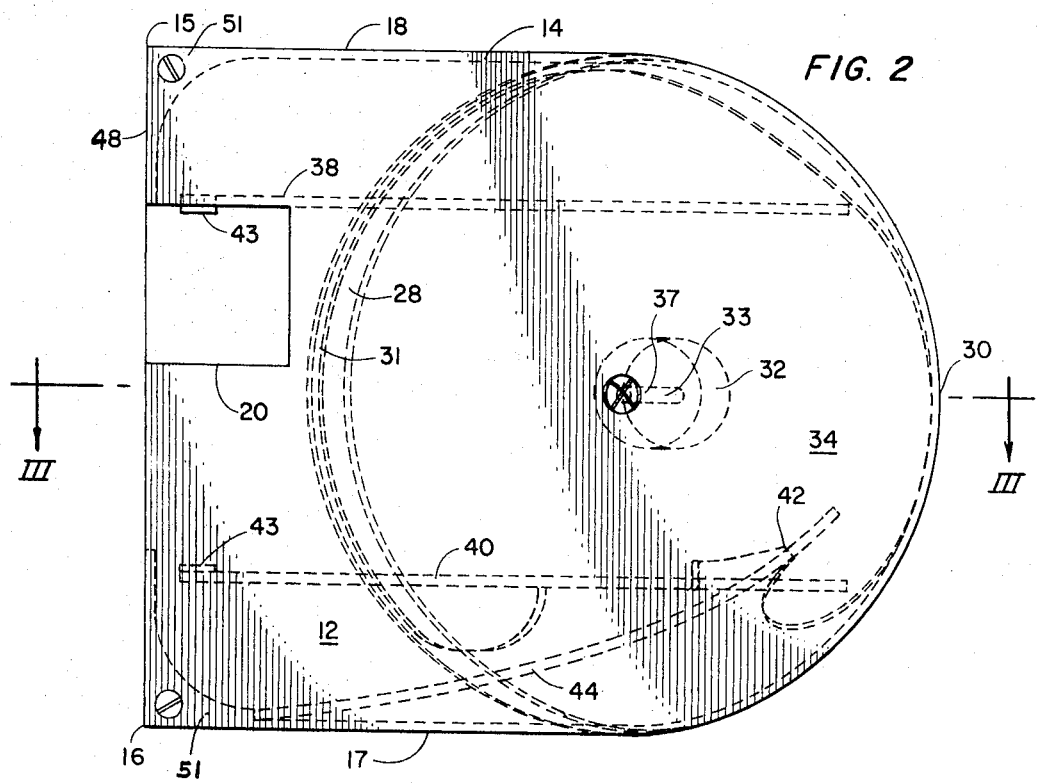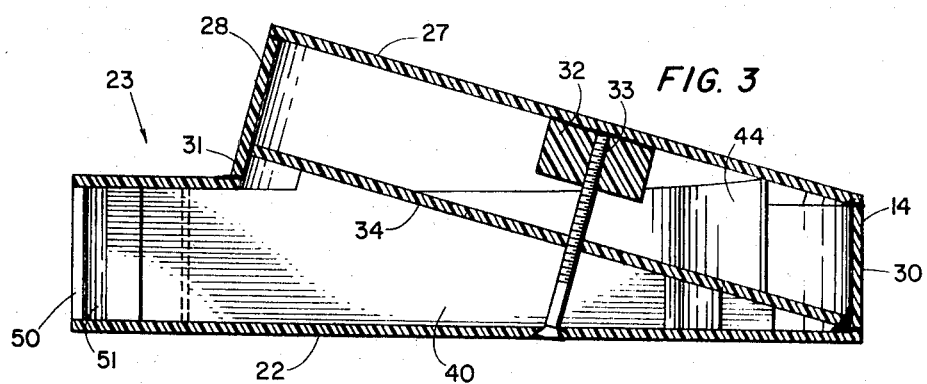

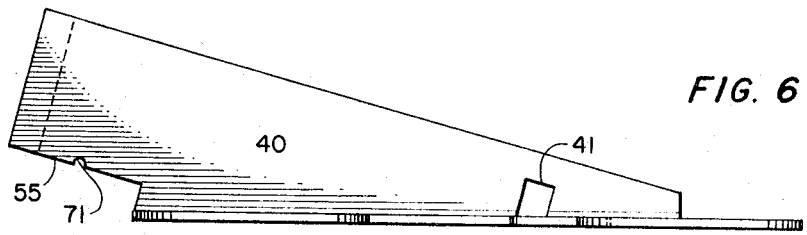
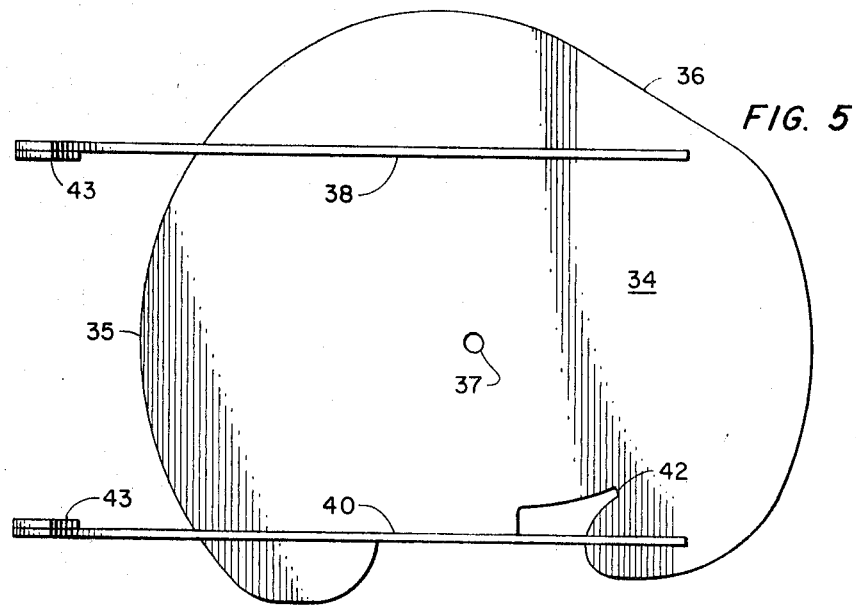
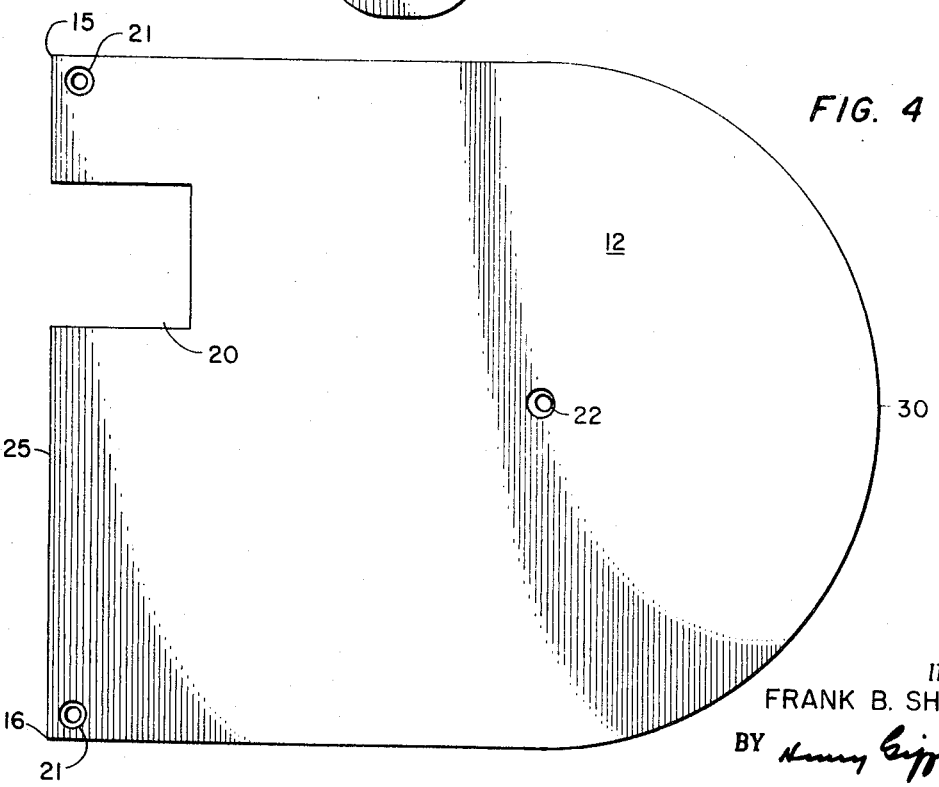
FIG. 6
FIG. 5
FIG. 4
INVENTOR.
FRANK B. SHROPSHIRE

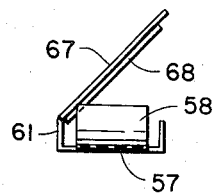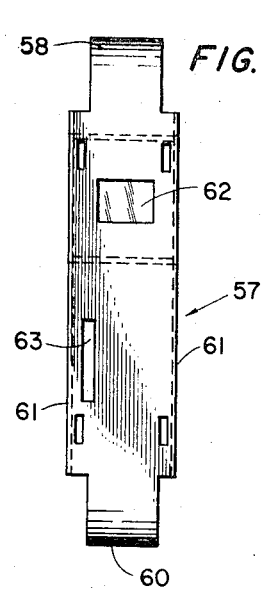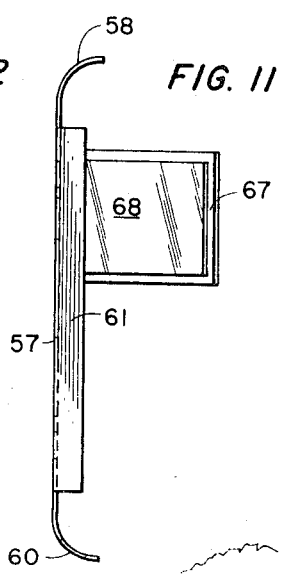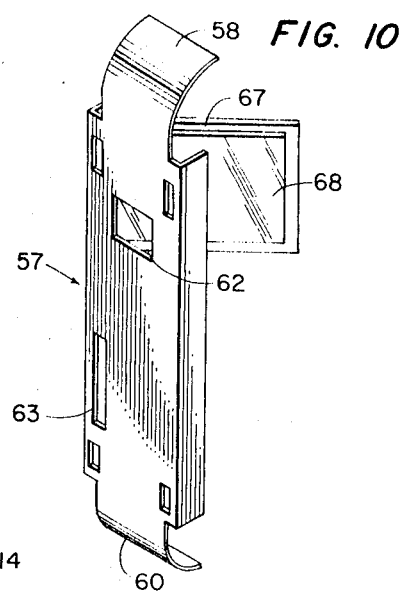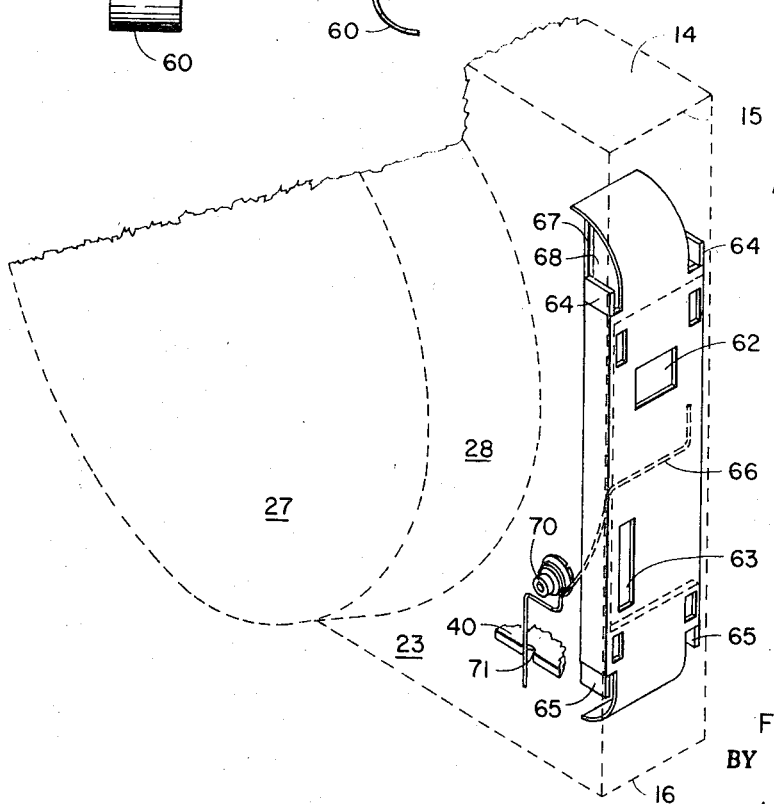

ns3,591,271

FILM CARTRIDGE

It is well known that endless loop films may be prepared so that the same sequence of subject matter may be shown over and over as many times as desired. The film being contained within a case is tamperproof and requires no threading or other handling. The endless film loop when placed within a cartridge so that the film will not be subject to handling or other damage from the winding and unwinding, but the manner of doing this simply was not easily accomplished. Heretofore the winding and unwinding was not simultaneous and has been accomplished by a complicated system of guides and spools or reels with the consequent many disadvantages, and the tightness of the winding of the film on the spools and reels has always been a problem of major concern and a constant source of difficulty. In the present invention the loose loop film is not retained in the cartridge by spools or other winding devices, but solely employs the natural winding curl of film and the like when produced in a spiral winding.

The danger of a loose loop is that it may draw tight and thus bind or scrape or otherwise damage the film as well as causing a malfunction in the projection. In the present invention the loose loop of film is confined in an open chamber which is angularly disposed with respect to the vertical axis of the projection. The takeoff to the projection aperture therefore requires an offset in the feeding of the film to the projection gate. In the present cartridge sufficient space has been provided so that the takeoff on the outside of the loose loop for delivery to the projection gate is commenced before the horizontal tangent. Thus, the film has a guided run of substantial length before it reaches the plane of projection, eliminating any possible twist or unnatural pull in the advancement frame by frame, regardless of the speed of the advancement.

The film is guided from the projection gate and plane in a lesser run to a film guide which directs the film with a slight turning movement to the inside of the spiral loop within the chamber of the angularly mounted housing. It is to be observed that the delivery of the film to the inner portion of the loop exerts an outward force as well as a rotating force which tends to keep the coil free and its several turns loose. Unexpectedly the result is that there is no pull on the outer loop in the unwind which in any way tends to pull the spirals tighter in the coil, and any tendency for the loop to become tightly wound is completely eliminated. The sole winding and unwinding force is created by the claw on the projector which advances the film frame by frame.

Film cartridges prior to the present invention do not contain any light-reflecting means. Accordingly, the light-reflecting means on the projector for projecting the images from the film must be such that it can be moved in and out of the way to permit the placing of the film cartridge in projecting position on the projector. It also has meant heretofore that sufficient additional space must be made in the walls of the cartridge to permit the swinging of the light-reflecting means on the projector, in and out of a sizable aperture through the wall of the film cartridge and into the interior thereof. Also, when the cartridge is to be removed from the projector, the light-reflecting means must be swung out of engagement within the film cartridge before the cartridge could be withdrawn or replaced. The light-reflecting portions of the system are, of course, critical for proper projection. Any banging or hitting of these swinging members not only interferes mechanically with the proper swing, but it also misaligns the light-gathering means and seriously affects the quality of the illumination and the resulting projection.

The elimination of these objections has been accomplished in a remarkably simple and direct manner by the cartridge described herein, so that there is little or no wear upon the continuous loop film, whether it rests on its face in vertical projection or on the edge of the coil in horizontal projection. Any malfunction because of improper winding or unwinding has thus been eliminated.

Further objects are to provide a construction of maximum simplicity, economy and ease of assembly and disassembly, also such further objects, advantages and capabilities as will fully appear and as are inherently possessed by the device and invention described herein, without any attempt to give them fully and in detail.

The invention further resides in the combination, construction and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof or the scope of the appended claims.

In the Drawings:

FIG. 2 is a plan view of the film case with the inner cover plate removed;

FIG. 3 is a sectional view of the film case taken on the line III-III of FIG. 2;

FIG. 4 is a plan view of the inner wall or cover;

FIG. 5 is a plan view of the film deck with the supports attached;

FIG. 6 is an elevational view of the film deck showing the supports;

FIG. 10 is a perspective view of the film platen;

FIG. 11 is a side elevational view of the film platen;

FIG. 12 is a front elevational view of the film platen;

FIG. 13 is a top plan view of the film platen;

FIG. 14 is a fragmentary phantom perspective of the film case showing the film platen in position.

Figure 1:
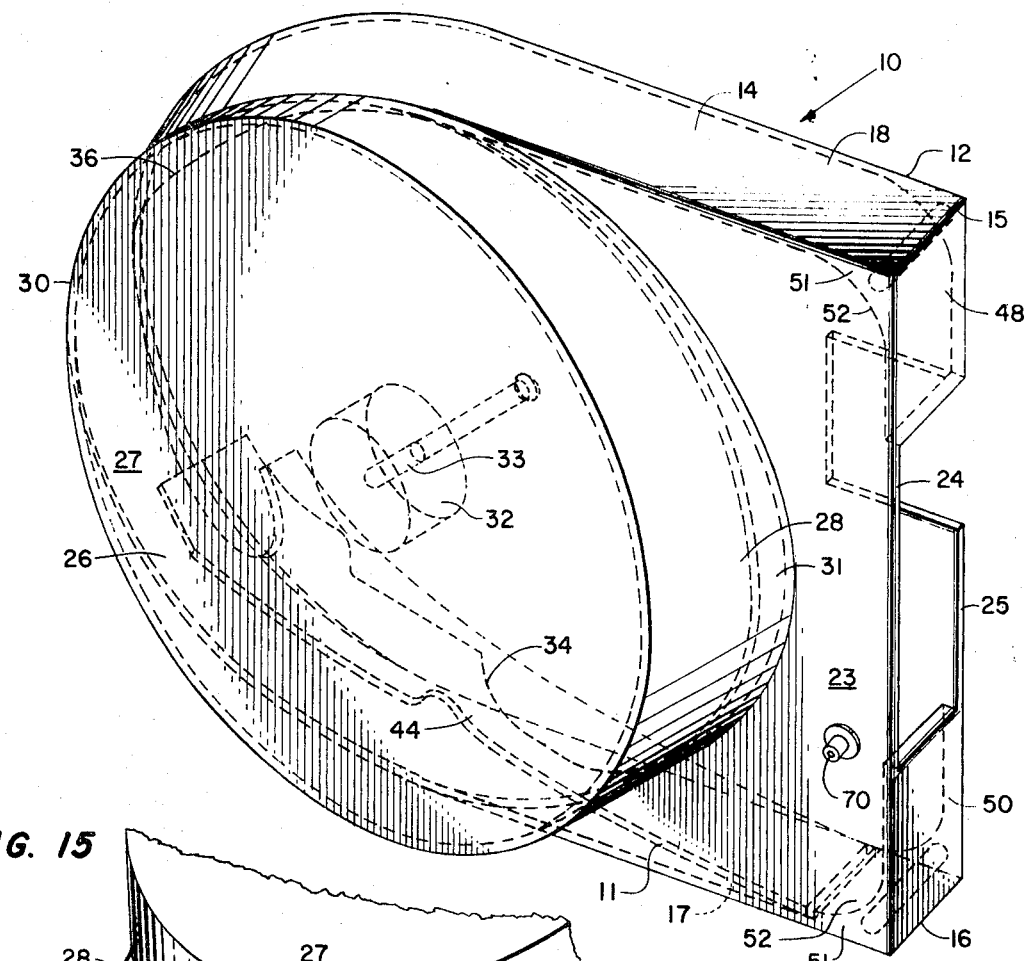
FIG. 1 is a perspective view of the film case without the enclosed film loop, showing some of the interior portions in dotted lines.

Referring now more specifically to the drawings, FIG. 1 shows a perspective of the film case 10 into which is placed a continuous loose loop film having no spool, either for winding or rewinding. The case in general form is perhaps best shown by FIG. 1 in perspective. Preferably it is made of a clear plastic, but any suitable material, whether fabricated or molded into shape, would be acceptable for the purposes intended. In the form shown in the drawings the case is designed primarily for vertical placement in a projector and has an outer wall 11 which is parallel to the inner wall 12 which are spaced from each other and secured together by a U-shaped wall 14 which commences at the top forward edge 15 of the outer and inner walls 11 and 12, continues rearwardly around an arc of 180° and terminates at the bottom forward edge 16. The bottom portion of the wall 14, as shown at 17, is parallel to the top portion thereof shown at 18. The width of the wall 14 is uniform throughout its entire length and is wider than the film loop which is to be contained therein.

The case 10 is made up of a few simple assemblies. The inner wall 12 is a flat sheet defining generally the size and elevational shape of the case 10 (see FIG. 4), and having a rectangular cutout 20 for the purpose of permitting the light beam from the light source to pass therethrough without obstruction, the purpose of which will become apparent later on. Holes 21 are for the purpose of securing the assembly together and hole 22 is angularly drilled at the same angle as the turret 26 on the opposite side or at an angle of approximately 15°.

The only portion of the outer wall 11 which is in a plane parallel to the member 12 is the forward portion 23, the forward edge 24 of which forms the sidewall of the forward portion. The edge 24 is, of course, parallel with and in the same vertical plane as the forward edge 25 of the inner wall 12. On the outer wall 11 is mounted an angularly mounted turret, generally designated 26, having a slightly elliptical outer cover 27 and a complementary wall 28. The wall 28 is at right angles to the cover 27 and is pitched at about 15°. The cover 27 is secured in position in contact with the U-shaped wall member 14 at substantially the midpoint 30 of the U-shaped bend therein. Diametrically opposed to the point 30 the wall 28 has a greater width than the wall 14, and this increased width is indicated diagrammatically at 31. Secured to the center of the cover plate on the interior thereof, there is a boss 32 having a threaded hole 33 axially thereof. The cover 27, the wall 28 and the boss 32 may be separately fabricated and assembled onto the portion 23 of the outer wall 11 and wall 14, or they may be molded or formed as a unit in any suitable manner, or together with the wall 23. It is to be understood that all of the outer wall 11 beneath the perimeter of the wall 28 is cut away so that the turret 26 forms an angular hollow slightly elliptical chamber in the outer wall 11.

The film deck 34 (see FIG. 5) is a free form with the forward portion 35 being the same arc as the interior curve of the wall 28. At the top portion 36 the curve is flattened to provide a space between the wall of the turret to allow the film to pass therebetween. The curves on the lower side are merely guides and provide not only space but a path for the continuous rewind of the film. The film deck 34 is positioned within the case 10 with its top surface parallel to the surface of the elliptical cover 27. Accordingly, the hole 37 must be bored at the same angle so as to be axially in register with the threaded bore 33. Attached to the under surface of the film deck 34 are two triangularly shaped supports 38 and 40. These are mounted in a parallel position. The two supports 38 and 40 are identical in shape and form except that the support 40 has a formed cutout 41 for notched engagement with the film rewind guide 44. For stability of the forward ends of the supports 38 and 40 and for the prevention of accidental breakage, reinforcements 43 may be added if desired.

Figure 8:
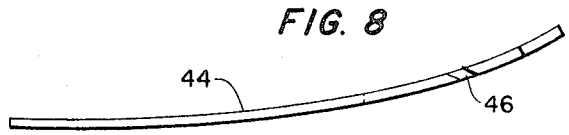
FIG. 8 is a top plan view of the film rewind guide.
Figure 7:
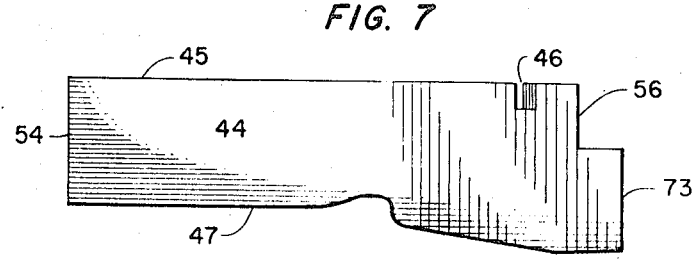
FIG. 7 is an elevational view of the film rewind guide.

There is an additional member 44 within the case 10, the rewind film guide (see FIGS. 7 and 8), which is substantially a floating member. This is a specifically formed member because it has to act both as guide for the rewinding of the continuous film and as a positioner for the delivery of the film from the film platen. It is linearly curved inwardly and its top edge 45 is provided with an angularly cut transverse notch 46 to receive the notch 41 of the support 40. Its lower edge 47 is peculiarly shaped with its curves smoothed to conform to the areas into which it fits and to provide no corners or rough edges for hang-up of the film in making the delivery during unwinding.

The front wall of the case 10 may be formed of two pieces 48 and 50. These are of the same width as the wall 14 and are perpendicular to the plane of the upper portion 18 of the wall 14 and the lower portion 17. For strength and for securing the rear cover in the final assembly, fillets 51 are secured. These fillets 51 not only lend stability to the case 10 but also provide the curves 52 on the inner faces thereof which act as guides to and from the film platen.

In assembling the film case the outer wall portion 11 including its turret 26 is laid so that the outer cover 27 is downward and the inner cavity upward. The film guide and directional member 44 is then inserted so that its forward end 54 engages the inner face of the wall 17 just rearwardly of the lower fillet 51 and with the curve thereof directed inwardly. The portion of the edge 47 of the member 44 which is parallel to its upper edge 45 rests against the inner face of the outer wall 23 and is substantially the identical width of the inner dimension between walls 11 and 12. The notch 46 is therefore upwardly.

The film deck 34 as an assembly including supports 38 and 40, shown in FIGS. 5 and 6, is then placed within the cavity with the supports 38 and 40 upwardly. In placing the deck 34 in position the larger ends of the supports with the reinforcing 43 are positioned forwardly. The lower edged 55 of the supports 38 and 40 rest against the inner face of the outer wall portions 23. This brings the inner unobstructed face of the deck 34 into position parallel to the top 27 of the turret to form a chamber for the film loop. The notch 41 of the support 40 engages in the notch 46 of the film guide 44 and this interlocking connection holds the film guide in position with the edge 56 of the face of the guide 44 penetrating into the cut 42 on the deck 34. In this manner the guide means 44 is loosely held in position while at the same time also holding the deck and its supports in position. The inner wall 12 is then positioned in place to confine all of the other elements and is secured by screws in the threaded holes 21 and by an angular screw which passes through hole 22 and secured in the threads 33 of the boss 32. All of this description relates to the portions of the various members which when assembled form the case which constitute the container for the film.

The film platen, which is generally designated 57, is a separate assembly within the case (see FIGS. 10–14). It is preferably a piece of metal which is stamped to present a guideway for the film. It is a linear piece of material having its ends 58 and 60 curved inwardly. During most of its straight length it has an extended margin with inturned flanges 61. There are several perforations in the straight away portion, the first and one of the most significant is the film gate or window 62 which is made the precise size of the frame on the film. There is an elongated vertical slot 63 through which the claw mechanism on the projector may project and engage the perforations on the film for advancing the film. Attached to the forward wall members 48 and 50 are parallel pairs of permanently fixed studs 64 and 65. These are not only for positioning the film platen but are spaced substantially the width of the film to guide the film precisely over the platen. The platen assembly fits loosely within the vertical opening defined between the forward wall 48 and 50. Although vertical movement is prevented by the pairs of studs or stops 64 and 65. The platen is held in position resiliently by a wire spring 66 which engages the rear surface of the platen below the film gate 62. The wire spring 66 is secured around a stud or screw 70 on the inner face of wall 23, and may pass through a notch 71 cut in the support 40 to prevent inadvertent rotation. Attached to and a part of the platen flange 61, on the turret side, is a leaf or support 67. This support is positioned at an inwardly directed angle of 45° with respect to the face of the platen 57. On the inner face of this angular support 67 is a mirror 68, or the two may be combined. The mirror 68 is considerably larger than the film gate 62 so that sufficient light can be gathered and passed through the film gate, the film and the lens system of the projector.

In the assembly of the case the film platen is dropped into position and held in position by the spring 66 which may be a simple wire spring as shown, secured by the stud or screw 70 on the inner face of the outer cover 23. If need be the support member 40 may be notched as at 71 in order to position the lower end of the spring 66. The platen 57 may of course, be coated to reduce any friction or wear on the film as it passes over.

Figure 9:
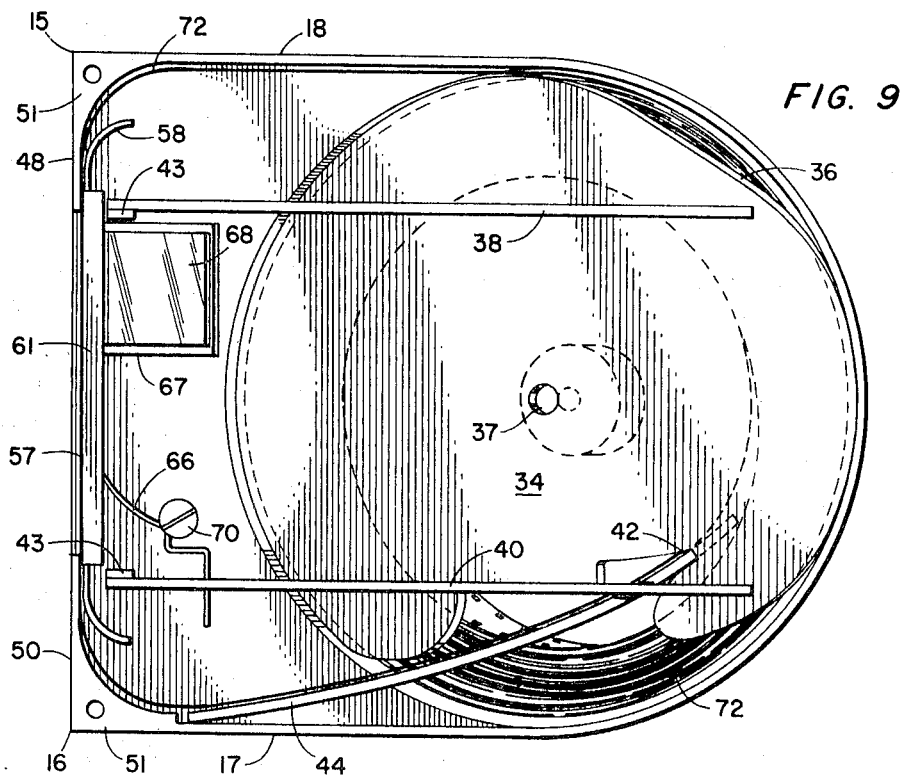
FIG. 9 is a plan view similar to FIG. 2, but with the film loop in position and the film platen in position.

As indicated earlier, the film 72 is a single loop of film loosely wound counterclockwise; as shown in FIG. 9, without any spool. The film 72 is positioned within the cavity formed by the turret wall 27 and the support for the film deck 34. This area provides two flat, unrestricted surfaces on which the film can rest and be retained without interruption or core. The film passes from the outer winding counterclockwise from this cavity through the space provided by the difference between the arc of the wall 18 and the arc 36 of the film deck. There is plenty of linear space to produce the offset of the film from the plane of the turret 26 to the plane of the platen 57. The offset begins approximately at point 30 and the film travels upwardly past the film deck arc at 36 and then against the inner face of the upper portion of the wall 18. It then passes downwardly following the curve of the upper fillet 51, over the entry end of the film platen 58, between it and the upper fillet 51. It then passes downwardly over the film gate 62 guided between the upper pair of studs 64, over the face of the film platen 57, downwardly around the lower curve 60 of the film platen and between it and the lower fillet 52. From here the loop of the film 72 engages the inner face of the film guide 44 and is directed upwardly and inwardly by it, back to the chamber of its original start by means of the tongue 73 of the guide member 44. This feeds the film 72 into the inwardmost loop, and as the film unwinds it is also continuously supplied to form the innermost coil.

It will be observed that there is no strain, pull, or drag upon the film at anytime so that there is no tendency for the film to wind tightly, but always remains in a loose series of coils, continually being fed from the outermost coil and continually wound into the innermost coil.

In beginning the description of this film container it was pointed out that there is provided a film case which will hold an abundant supply of film in a loose continuous loop with no strain, pull, or drag on the film in winding or unwinding. The film is advanced one frame at a time by means on the projector, i.e., the claw (not shown), engaging the film perforations provided conventionally along the marginal edges of the film in the area indicated by the slot 63. The slot provides a means so that the advancing claw may engage the perforations one at a time and advance the film one frame at a time. Once the film is placed within the case 10 it is not subject to damage by handling, by tearing or by any form of manual or inadvertent abuse. The parts are arranged so that if for any reason the film has to be replaced, a new film may be inserted in its stead without destroying the entire case.

Figure 15:
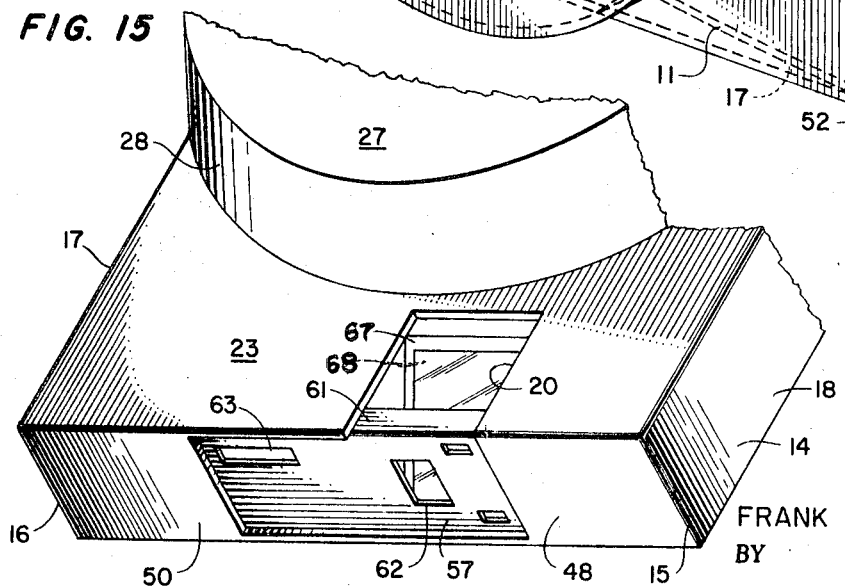
FIG. 15 is a view similar to FIG. 4, but showing the light beam opening 20 in the outer wall and the platen with a right-hand mirror for horizontal projection.

The film case 10 shown and described to this moment is, as stated earlier, for vertical positioning within the projector. There are many times, however, when horizontal feeding or horizontal positioning of a film cartridge in the projector would be of great advantage. One of them is that there is less wear on the film. However, in the horizontal position the inner face of the film deck 34 bears the entire weight of the film loop and therefore might possibly be subject to frictional malfunction. To provide a film cartridge for horizontal feeding, the film deck 34 should be made of Teflon (polyfluorovinyl resin) or other equivalent material which is slippery and almost frictionless. In order to get the projection light to the film the opening 20 would have to be similarly positioned only in the face of the outer cover 23 as shown in FIG. 15. The 45° support and the mirror 68 contained as a part of the film platen within the case would be on the right-hand side instead of on the left-hand side as shown in FIG. 13. In all other respects the function and operation of the film case is identical with that earlier described.

I claim:

1. A cartridge for endless developed looped film ready for projection when positioned in a projector where the film of individual frame simultaneously feeds to the projection gate from the outside of the continuous loop and rewinds to the inside thereof, in combination a closed container for said film independent of the projector, a film platen loosely mounted within said container supporting the film before, during and after projection having a gate aperture positioned to pass the light of projection therethrough and through a frame of said film presented for projection, and having a rearward angularly mirror mounted integrally and moveable with said platen completely with said platen completely within said cartridge and in alignment with said gate to direct the light for projection, and unobstructed aperture means through the wall of said cartridge in alignment with said mirror and at right angles to said gate permitting the passage of projection light therethrough when positioned for projection.

2. The cartridge of claim 1 wherein the wall having the aperture means for admitting projection light is a continuous face at right angles to the plane of projection.

3. A cartridge for an endless developed spirally looped film for projection where the film loop is simultaneously fed from the outside of the loop and returned at the inside thereof, in combination a closed container for said continuous film including, a front wall defining the plane of projection, an inner wall at right angles to the plane of projection, and outer wall parallel to said inner wall having a circular turret portion offset outwardly with respect to the plane of said wall, a wall contiguous with the said front wall and joining said inner and outer walls, an unobstructed platform spaced within said circular turret and disposed substantially at the same angularity for supporting the loosely coiled loop film edgewise thereon, said platform having suitable cut away portions for the simultaneous feeding from the periphery and returning of said film on the inside of said loop, a platen resiliently mounted in said front wall having a light passing projection gate therein, a light reflecting mirror mounted within said cartridge in alignment with said gate and integral with and moveable with said platen for passing projection light through said projection gate and film at the same angle at all times, and an aperture in said inner wall aligned with said mirror to permit the passing of projection light unobstructed to the said mirror when in position for projection.